Patented May 8, 1934

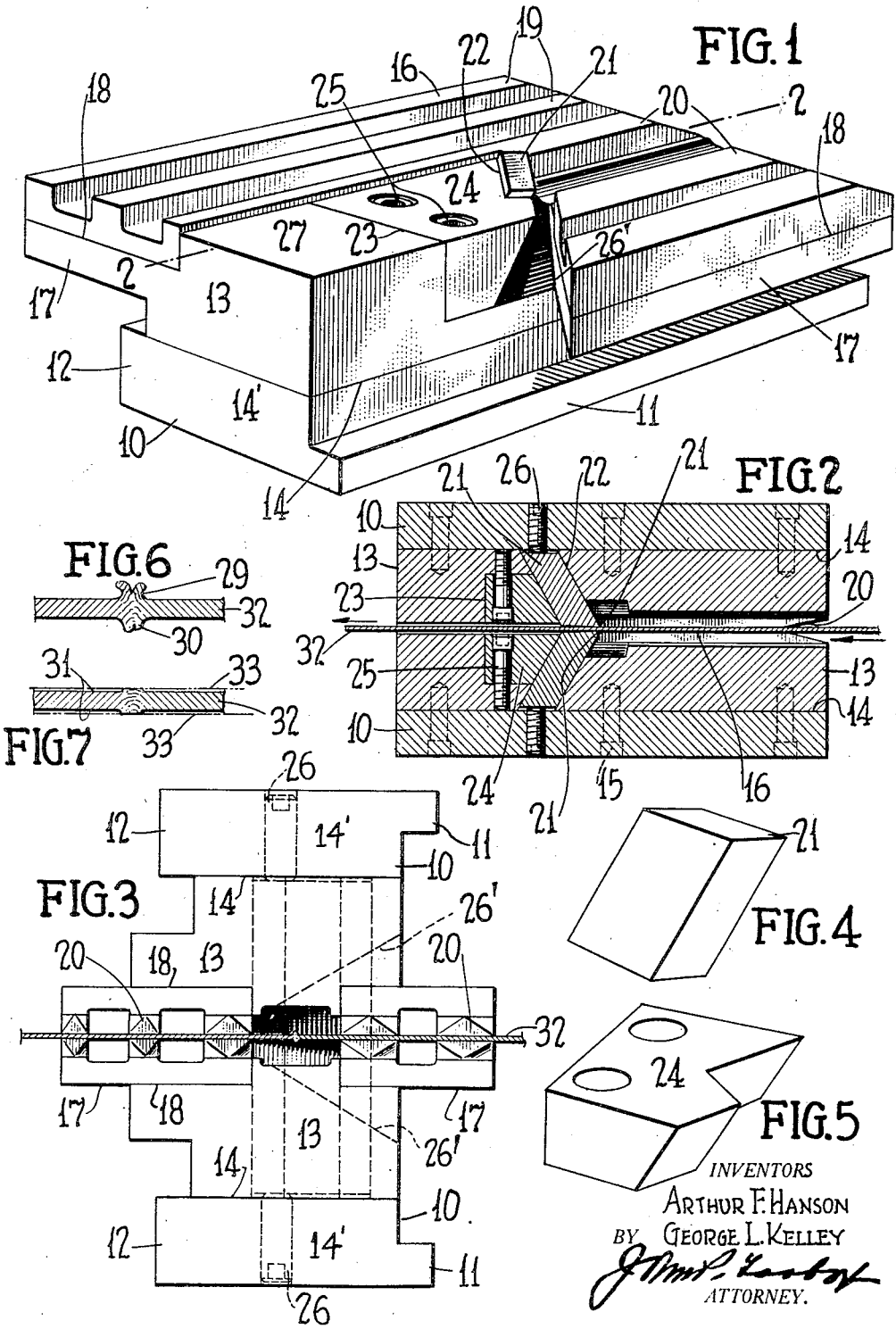

1,958,147

UNITED STATES PATENT OFFICE 1,958,147

FLASH REMOVING TOOL

George L. Kelley and Arthur F. Hanson, Philadelphia, Pa., assignors to Edward G. Budd Manufacturing Company, Philadelphia, Pa., a corporation of Pennsylvania Application March 25, 1931, Serial No. 525,186
Renewed January 31, 1934

6 Claims. (Cl. 90—24)

The flash removing tool of our invention finds its principal utility in the removal of flash from products produced by an electric flash welding operation. Such operation results in the forming of a relatively high ridge of metal on each side of the flash welded seam. While solid in its main body, the outer portions of this flash are extremely irregular and rough, present a very unsightly appearance and whenever located on the exterior of the fabricated article must needs be removed. A machine for so removing the flash is the subject of a co-pending application filed in the name of George L. Kelley, Serial No. 521,490, filed March 10, 1931. The tool of our invention is intended for use in such a machine. The machine is of a draw bench type in which the tool is rigidly fixed in place and the work is drawn past it.

The outstanding object of the invention is the attainment of a cutting tool which will very accurately preserve at all times the relation of its plane of cutting to the outer surface of the work whereby the tool consistently operates upon the flash without cutting the adjoining zones of the body of the work. This involves several ancillary objects, the strong urging of the work to the cutter head, the elimination of chatter, the accurate guiding of the work with respect to the cutting edge per se, and the prevention of wandering from the plane of cutting due to irregularities in the surfaces of the body of the material. Coordinate objects are the provisions to avoid marring of the surface of the product from which the flash is being trimmed, ready adjustment, removal and replacement, and secure clamping of the cutting edge in place on the cutter head, rigid mounting of the tool itself, free and prompt elimination of chips as they are cut, and last but by no means least, the attainment of a tool which can effectually be used in opposition to another and similar tool operating simultaneously upon the same welded seam from the opposite side of the work.

These and other ends we attain in our invention through constitution of the main body of the cutter head with an expansive work engaging face and mounting of the cutting edge per se within the borders of this face in a manner adapting it to engage the flash substantially in the plane of the work engaging face, whereby the work is aligned with respect to the cutting edge by the expansive face and the action of the cutting edge is stabilized and unified by its engagement with the work within the borders of the work engaging face. The work engaging face is longitudinally ribbed in the general direction of the progress of the work and the ribs are pointed at their forward ends whereby materials which might enter between the face and the work are diverted by the ribs passing through the spaces between them and marring is avoided. The cutting edge per se is socketed to extend obliquely rearwardly in the direction of travel of the work and obliquely laterally. The cutting action thereby urges the work strongly toward the expansive work engaging face. A chip removing recess emanates ahead of the cutting edge and extends obliquely laterally and rearwardly openly to the face of the work whereby the chips are promptly removed. Cutting the expansive work engaging face away rearwardly and laterally in the direction of the recess and to a depth laterally of the cutting edge substantially equal to the depth of the recess clears the chips from the cutting tool immediately and assures their free traverse laterally out of the way.

The details of the adjustments, etc., and those features of the cutter head leading to its better mounting and its coaction with a similar tool for work on the same seam will be more fully apparent from the accompanying drawing.

Of the drawing—

Figure 1 is a general perspective view looking over the expansive work engaging face of the tool.

Fig. 2 is a longitudinal cross section taken approximately on a line as indicated by the line 2—2 of Fig. 1 through two opposed cutters, the sheet being operated on being also shown in section.

Figure 3 is a front elevation of a pair of cutting tools simultaneously engaged upon the same work seam.

Figures 4 and 5 are respectively perspectives of a cutting edge per se and a clamping block therefor; and Figures 6 and 7 are respectively cross sections of the work seam of welding flash before and after removal of the flash by the tool.

The main body of the cutter head is designated 10. It is adapted for longitudinal mounting in gibs on a machine by longitudinally extending mounting ribs 11 and 12 on its opposite sides. These ribs are slid longitudinally into the ways of the gibs for their full lengths and appropriately clamped therein as is common practice in connection with the tools of planers and the like. This is known to give a very much firmer and enduring anchorage of a cutter head.

The top of the cutter head 13 is formed separately from the bottom 14' which carries the mounting ribs 11 and 12 as indicated by the parting line 14, whereby the top and bottom portions may be separated for repair or replacement. Any known means of relatively securing them, as for example, the bolts 15 shown in dotted lines in Fig. 2, may be used.

The top 13 is provided with the expansive work engaging face designated generally 16 and in a plane substantially parallel to the ribs 11 and 12. The top 13 is extended laterally by the wing portions 17 to increase the expanse of this surface 16. The expansive surface 16 is separable from the main body 13 of the top portion as designated by the separation lines 18 whereby the surface 16 may be separated from the remainder for repair and replacement. The longitudinally extending ribs 19 are formed in this separable portion 16. They are longitudinally in the general direction of the travel of the work and are provided forwardly with ends 20 pointed away from the general plane of surface 16 and therefore away from work engaged by that surface as appears more fully in Figs. 2 and 3.

The cutting edge per se is designated 21 and is clearly shown to be located within the marginal borders of the expansive work engaging face 16. Its main body is inclined both rearwardly and laterally of the work. Engaging the same at such obliquity and substantially in the plane of the work engaging face 16 as clearly appears in Fig. 2, the manner of its drawing the work toward the engaging face becomes apparent, for the attached portions of chips being removed bear the oblique cutting edges 21 always toward the work. In combination with the expansive and ribbed work engaging faces 16 this avoids the inducing of chatter. Any tendency to induce chatter which may arise is absorbed through the expansiveness of the engagement of the surfaces 16 and the massiveness of the head 10 which supports them.

The edge 21 is carried in a socket 22 and is of corresponding obliquity to the rear of the socket. The cutter head 10 is provided with a rearwardly shouldered recess 23. In this recess is mounted the clamping block 24 which is shaped to engage and clamp the cutting edge 21 in its socket on both its rear and side walls, and to take up re-action in the direction of progress of the work against the rear shoulder of the recess 23. These blocks are secured removably in place by means of bolts 25. The cutting edges 21 are minutely adjusted with respect to the plane of the work engaging faces 16 by screws 26 passing through the bodies of the cutting heads 10 and bearing on the outer ends of the cutting edges 21. Upon easing off of pressure of the clamping blocks 24, the edges 21 may be freely adjusted by screws 26 and thereupon firmly clamped in their sockets 22 and borne strongly against the adjusted screws 26 upon again tightening of the blocks 24.

The chip receiving recess of rearward and lateral extent is designated 26' and is shown extending from a point in front of the edge 21 laterally all the way to the lateral face of the cutter head 13. Rearwardly of the cutting edge 21 the face 16 is cut-away being represented by the depressed face 27 of the body of the cutter head 10. Rearwardly and laterally and behind the recess 26' the body of the cutter 10 is removed all the way to the mounting rib 11 on the side of the recess. Thereby chips from the cutting edge 21 are not only freed from the edge 21 but also freed entirely from all parts of the cutter head at large, being given free and direct access to spaces laterally removed from the cutter head. Thereby they may not jam between the closely adjusted work engaging faces 16 and the work and thereby mar the same.

In the flash removing apparatus of the application of George L. Kelley above mentioned two of these tools are used oppositely as shown in Fig. 3. We prefer to use two of them not identical, but mates in that the oblique lateral arrangement of cutting edge 21, the recess 26 and the cut away portions of the body 10 behind the edge 21 and recess 26 together with the ribs 11 and 12 are arranged laterally opposite when the tools are viewed as in Fig. 1. Thereby when the one is placed above and the other beneath, corresponding parts are vertically juxtaposed and there results a mutuality of re-action with the work and with each other which augments in a great degree the advantages flowing out of the construction of the individual units. Specifically, the regularity, stability, uniformity and accuracy of the work is thereby greatly enhanced for any unbalanced re-actions between work and one unit, upper or lower as the case may be, is absorbed by its re-action against the opposed unit.

A typical seam condition is that shown in Fig. 6. It will be observed that the upper flash of the seam designated 29 is larger and somewhat more irregular than the lower flash 30. This is a condition encountered in flash welding machines of a certain type. Relative irregularities of the top and bottom of the seam may likewise result from differences in resistance and composition of the metal of the sheets which are welded together and differences in cooling conditions as well as otherwise. Whatever they may be, the flash removing tools of our invention are adapted through their construction and arrangement to cope with them effectively and gain the advantages we have sought. Preferably we do not remove the flash all the way to the surface 31 of the work 32 but in planes 33 very close thereto and remove therefrom by those slight tolerances necessary to preclude surface engagement of cutting edges 21 and surfaces 31 incident to any surface irregularities which the expansive work engaging faces 16 may not iron out. They do iron out sheet undulations and the like to a great degree but a tolerance of one or two one thousandths of an inch takes care of irregularities which are not ironed out, such for example, as differences in sheet gauge. The flash removing tools of our invention are peculiarly adapted to maintain and to do uniformly good work within the close tolerances between the planes indicated by the line 33 and the general plane of the surfaces 31 of the work.

Figs. 2 and 3 show the direction of relative travel of the work as respects the tools 10.

Construction of the tool so that its several parts may be separated in planes 14 and 18 is highly advantageous not only by reason of the readiness with which the several portions subject to wear can be readily renewed, but also because the several portions can be each made of those materials best suited for the work. It has to do with greater economy in manufacture, and also the recessing and socketing in connection with the inserted cutting edges 21 can be more readily, cheaply and accurately done, and also sockets 22 may extend all the way through the body portions 13 there to meet freely the adjusting screws 26 which are borne wholly in the gib carrying portions 10.

A breadth of interpretation of the annexed claims commensurate with the generic spirit of the invention is solicited entirely independently of semblances of form of the elements of construction used in this new combination to elements used in other machine tools to entirely different ends. All modifications and improvements not departing from this generic spirit are intended to be comprehended by the annexed claims.

What we claim as new and useful and desire to protect by Letters Patent is:—

1. A tool of the character described comprising a main body having substantially parallel plane faces, a cutting edge socket extending from face to face of said main body, removable ribbed work engaging faces secured to one face of said main body and removable means carrying mounting gibs for the tool secured to the other face of said main body, said means carrying adjusting means for the cutting edge in line with said socket.

2. A tool of the character described comprising a main body having a socket for a removable cutting edge, a cutting edge and means for rigidly clamping said cutting edge in the socket, together with removable work guiding and locating plates extending a substantial distance laterally and forwardly of said cutting edge on one face and removable mounting gibs on the other face.

3. A tool of the class described having a central longitudinally extending main body portion provided adjacent one face thereof with longitudinally extending gibs for rigidly securing it to a machine, and having adjacent its opposite face lateral extensions supporting a ribbed work supporting and guiding face, the ribs of said face extending in the direction of relative movement of the tool and work, the central portion of said main body being provided with a laterally and rearwardly inclined socket, an adjustable cutting edge fitting said socket and extending to the work supporting and guiding face, and means for rigidly clamping the cutting edge in said socket.

4. A tool of the class described having a central longitudinal main body portion having longitudinal gibs secured adjacent one face thereof for rigidly securing it in a machine, and having adjacent its opposite face lateral extensions supporting a longitudinally ribbed work supporting and guiding face, an adjustable cutting edge socketed in the central portion of said main body and extending in a laterally and rearwardly inclined direction, and a chip clearing recess opening in front of said cutting edge and extending laterally and rearwardly to a rearwardly open space at the side of the tool body, whereby the chips removed by the cutting edge are deflected away from the ribbed supporting and guiding areas of the cutter head.

5. A tool for removing projecting portions from thin metal sheets comprising a cutter head having a main body adapted to be rigidly secured in a machine, removable work engaging face portions ribbed in the direction of relative movement of the tool and work, a cutting edge socketed and clamped in position centrally of said face portions whereby the face portions extend substantial distances forwardly and laterally of said cutting edge, and an opposed work guide and support associated in fixed relation to said cutter head and having a similar ribbed work engaging face of extensive area forwardly and laterally of the cutting edge and cooperating with the cutter head to prevent any substantial buckling of the sheet metal under the action of the cutting edge.

6. A tool for removing projecting portions from thin metal sheets comprising a cutter head having a central longitudinally extending main body portion adapted to be rigidly secured in a machine, work engaging face portions extended laterally beyond the main body portion for a substantial distance, a cutting edge socketed and clamped in position centrally of said face portions, said face portions being constituted of the tops of a plurality of longitudinal ribs, having their entering ends tapered in two directions, and an opposed work guide and support associated in fixed relation to said cutter head and having a similar ribbed work engaging face and cooperating with the cutter head in facilitating guiding of the work to the cutting edge and in preventing any substantial buckling of the sheet metal under the action of the cutting edge.

GEORGE L. KELLEY.
ARTHUR F. HANSON.